US012683676B2

(12) United States Patent
Patel et al.

(10) Patent No.: US 12,683,676 B2
(45) Date of Patent: Jul. 14, 2026

(54) WORKLOAD MANAGEMENT IN LOW EARTH ORBIT DATA CENTERS

(71) Applicant: International Business Machines Corporation, Armonk, NY (US)

(72) Inventors: Kushal S. Patel, Pune (IN); Gandhi Sivakumar, Bentleigh (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 18/374,104

(22) Filed: Sep. 28, 2023

(65) Prior Publication Data

US 2025/0112689 A1      Apr. 3, 2025

(51) Int. Cl.
*H04B 7/185* (2006.01)

(52) U.S. Cl.
CPC ..... *H04B 7/18539* (2013.01); *H04B 7/18595* (2013.01)

(58) Field of Classification Search
CPC   H04B 7/18539; H04B 7/18595; H04B 7/185; H04B 7/18519; H04W 40/248; H04L 67/60; H04L 67/1025
See application file for complete search history.

(56) References Cited

U.S. PATENT DOCUMENTS

| | | | |
|---|---|---|---|
| 2015/0372938 A1* | 12/2015 | Patel | H04L 45/04 |
| | | | 709/226 |
| 2020/0233652 A1 | 7/2020 | Al-Naser et al. | |
| 2020/0322844 A1 | 10/2020 | Tatum | |
| 2023/0156826 A1 | 5/2023 | Palermo et al. | |
| 2023/0164089 A1 | 5/2023 | Greene et al. | |
| 2024/0195495 A1* | 6/2024 | Sajassi | H04B 10/118 |
| 2025/0175422 A1* | 5/2025 | Atwal | H04B 7/18565 |

FOREIGN PATENT DOCUMENTS

| | | |
|---|---|---|
| IN | 202011032223 A | 8/2020 |
| WO | 2025/006824 A1 | 1/2025 |

OTHER PUBLICATIONS

Deng et al, "Distance-Based Back-Pressure Routing for Load-Balancing LEO Satellite Networks", IEEE Transactions On Vehicular Technology, vol. 72, No. 1, Published Date: Sep. 14, 2022, 14 pages. https://ieeexplore.ieee.org/document/9891822.

(Continued)

*Primary Examiner* — Dominic E Rego
(74) *Attorney, Agent, or Firm* — James Olsen; SCULLY, SCOTT, MURPHY & PRESSER, P.C.

(57)      ABSTRACT

Systems and methods for modulating conductance of a plurality of unit cells are described. A data center coupled to a low Earth orbit (LEO) satellite can determine an activation window of an application. The data center can map the orbital movements of the LEO satellite to the activation window of the application. The data center can allocate a resource group to the application. The data center can schedule a server in the data center to run the application according to a result of the mapping and the allocation of the resource group.

20 Claims, 7 Drawing Sheets

(56)             References Cited

OTHER PUBLICATIONS

Roth et al.,"Distributed SDN-based Load-balanced Routing for Low Earth Orbit Satellite Constellation Networks", Published In: Advanced Satellite Multimedia Systems Conference and the 17th Signal Processing for Space Communications Workshop (ASMS/SPSC), Published Date: Oct. 13, 2022, 8 pages. https://ieeexplore.ieee.org/document/9914690.

Kudoh et al.,"Dynamic Load Balancing Method Based on Congestion Prediction for IP/LEO Satellite Networks", IEICE Transactions on Communications, VOLE92-B, No. Nov. 11, 2009, 9 pages. https://www.researchgate.net/publication/220238054_Dynamic_Load_Balancing_Method_Based_on_Congestion_Prediction_for_IPLEO_Satellite_Networks.

Liu et al.,"A hybrid global-local load balancing routing scheme for the Internet of Things through satellite networks"International Journal of Distributed Sensor Networks 2017, vol. 13(3). The Author(s) 2017.DOI: 10.1177/1550147717692586, Published Date: Mar. 14, 2017, 16 pages. https://journals.sagepub.com/doi/10.1177/1550147717692586.

International Searching Authority, "Notification of Transmittal of the International Search Report and the Written Opinion of the International Searching Authority, or Declaration," Patent Cooperation Treaty, Dec. 16, 2024, 12 pages, International Application No. PCT/EP2024/076870.

Mathar et al., "Change Management: Identifying Change Agents Using Social Network Analysis in an ERP Implementation", International Journal of Computer Engineering and Technology (IJCET), Feb. 2020, pp. 1-9.

Nikunj Patel, "The Sky Is the Limit in 56 Game of Drones", https://www.einfochips.com/blog/sky-limit-5g-game-drones/, Oct. 27, 2017, 7 pages.

No Author, "Samsung, Cisco and Orange Demonstrate SG-Powered Drone and Industrial Robot at MWC19", https://news.samsung.com/globallsamsung-cisco-and-orange-demonstrate-5g-powered-drone-and-industrial-robot-at-mwc19, Feb. 26, 2019, 4 pages.

Stefan Tasevski, "5G and Drones", https://dronebelow.com/2018/08/31/5g-and-drones/#google_vignette, Aug. 31, 2018, 19 pages.

Stephanie Condon, "CES 2019: Verizon showcases the potential of 5G with drones, Disney and more", https://www.zdnet.com/article/ces-2019-verizon-showcases-the-potential-of-5g-with-drones-disney-and-more/, Jan. 8, 2019, 16 pages.

Victor Tangermann, "NASA Is About to Test a Giant Solar Drone That Broadcasts 5G", https://futurism.com/the-byte/aerovironment-softbank-5g-drone-uav, Mar. 8, 2019, 20 pages.

Zbieg et al., "How to Select Change Agents in Organizations? A Comparison ofthe Classical and Network Approaches", Problemy ZarzÉdzania, Dec. 2016, pp. 120-143.

* cited by examiner

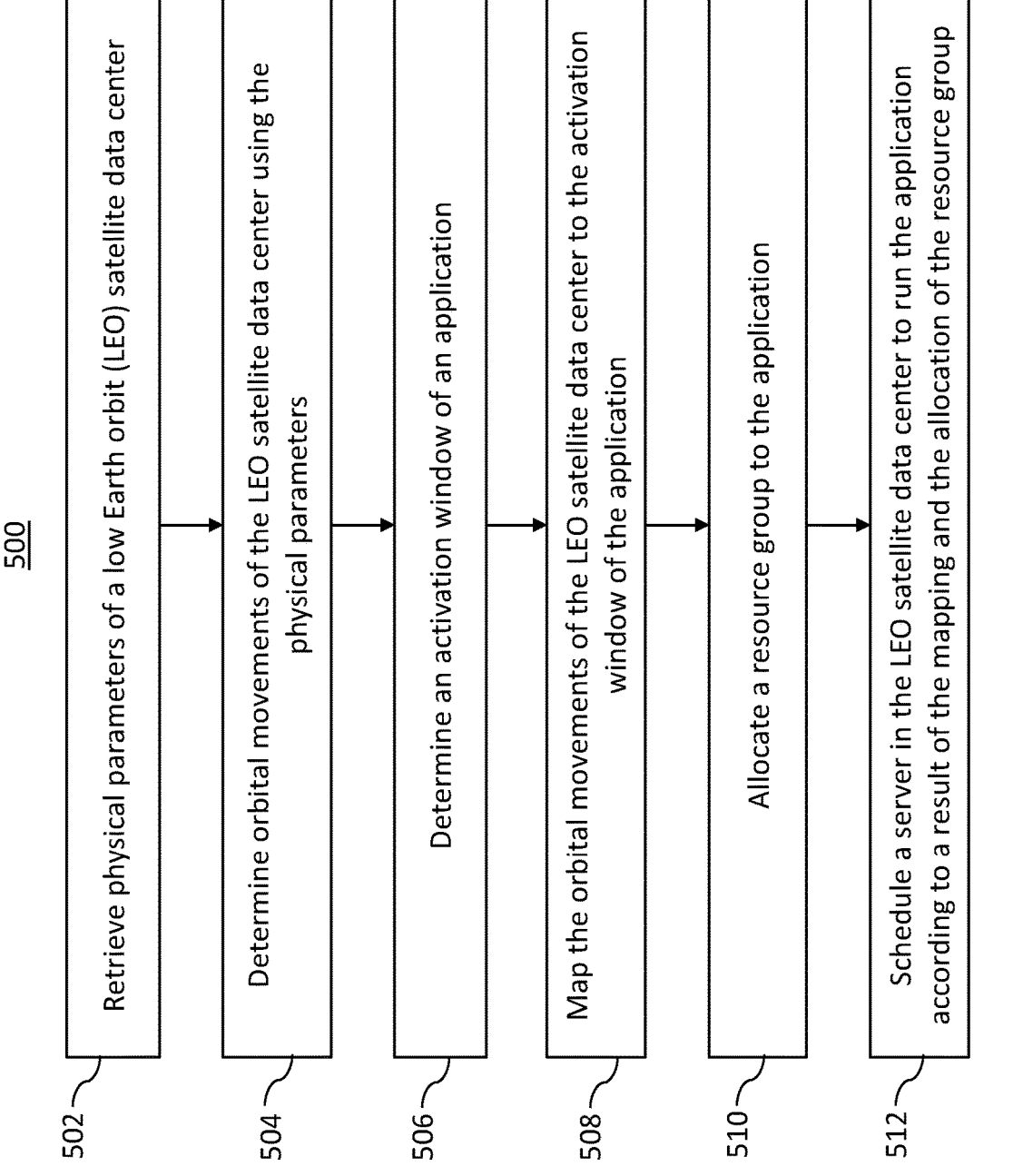

500

502 — Retrieve physical parameters of a low Earth orbit (LEO) satellite data center 504 — Determine orbital movements of the LEO satellite data center using the physical parameters 506 — Determine an activation window of an application 508 — Map the orbital movements of the LEO satellite data center to the activation window of the application 510 — Allocate a resource group to the application 512 — Schedule a server in the LEO satellite data center to run the application according to a result of the mapping and the allocation of the resource group

Fig. 7

WORKLOAD MANAGEMENT IN LOW EARTH ORBIT DATA CENTERS

BACKGROUND

The present application relates generally to computing systems and computer-implemented methods for workload management in low Earth orbit (LEO) data centers.

A low Earth orbit (LEO) is an orbit that is relatively close to Earth's surface. It is normally at an altitude of less than 1,000 kilometers (km) but could be as low as 160 km above Earth—which is relatively low compared to other orbits, but still far above Earth's surface. In an aspect, geostationary (GEO) satellites need to orbit along Earth's equator, whereas LEO satellites do not always have to follow a particular path around Earth and their plane can be tilted. Thus, there can be more available routes for satellites in LEO, which causes LEO to be a commonly used orbit. Additionally, since the LEO satellites orbits Earth with reasonably closer distance, direct microwave transmission from user devices on Earth to LEO is possible. Such direct microwave transmission can lead to various use cases for LEO satellites, such as LEO satellite data centers that can directly exchange data with user edged devices such as mobile devices or Internet of things (IoT) devices.

BRIEF SUMMARY

The summary of the disclosure is given to aid understanding of a system and method of workload balancing in LEO satellite data centers. Workload balancing can be proactively performed prior to the LEO satellite data center arriving at an activation region of an application, which can provide improved coverage for the application, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or their method of operation to achieve different effects.

In one embodiment, a method for operating a low Earth orbit (LEO) satellite data center is generally described. The method can include determining, by a processor, an activation window of an application. The method can further include mapping, by the processor, orbital movements of the LEO satellite data center to the activation window of the application. The method can further include allocating, by the processor, a resource group to the application. The method can further include scheduling, by the processor, a server in the LEO satellite data center to run the application according to a result of the mapping and the allocation of the resource group.

In one embodiment, a system for a LEO satellite data center is generally described. The system can include a LEO satellite and a data center coupled to the LEO satellite. The data center can be configured to determine an activation window of an application. The data center can be further configured to map orbital movements of the LEO satellite to the activation window of the application. The data center can be further configured to allocate a resource group to the application. The data center can be further configured to schedule a server in the data center to run the application according to a result of the mapping and the allocation of the resource group.

In one embodiment, a computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 7 is a flow diagram illustrating a method of performing workload management in low Earth orbit data centers in one embodiment.

DETAILED DESCRIPTION

Figure 1:
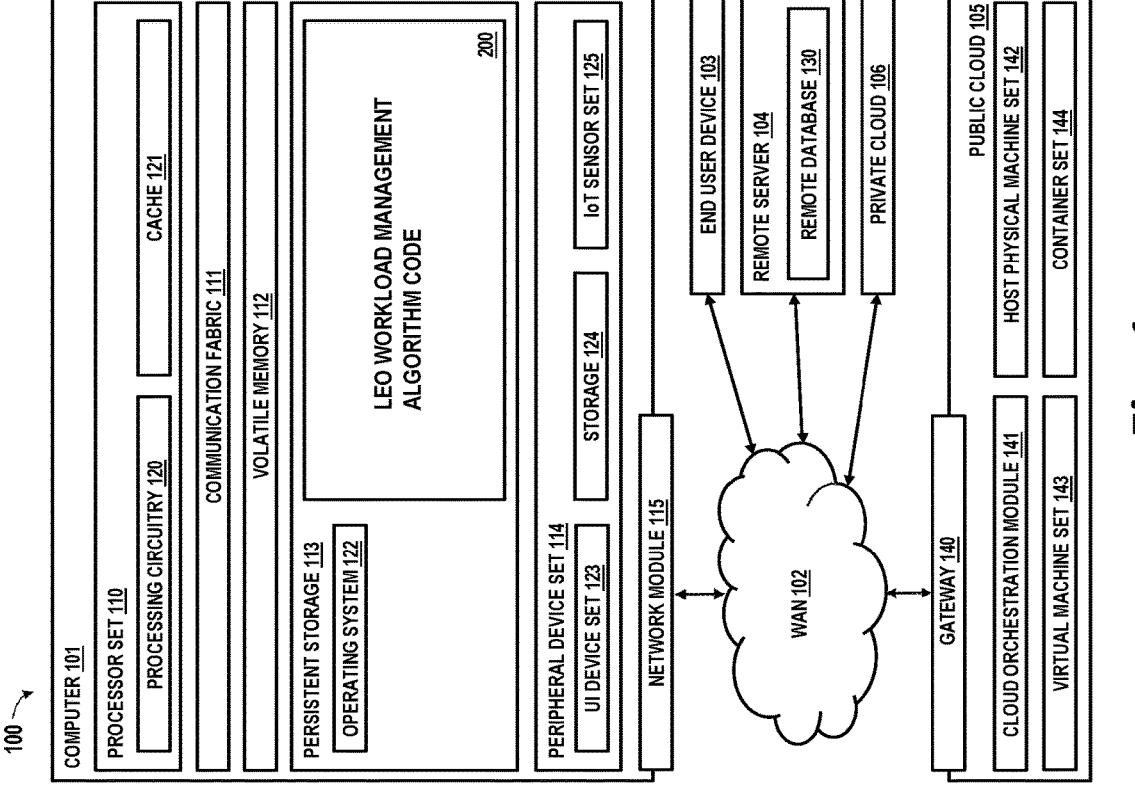
FIG. 1 illustrates an example computer or processing system or environment that may implement a system for workload management in low Earth orbit data centers in one embodiment.

According to an aspect of the invention, there is provided a method for operating a low Earth orbit (LEO) satellite data center. The method can include determining, by a processor, an activation window of an application. The method can further include mapping, by the processor, orbital movements of the LEO satellite data center to the activation window of the application. The method can further include allocating, by the processor, a resource group to the application. The method can further include scheduling, by the processor, a server in the LEO satellite data center to run the application according to a result of the mapping and the allocation of the resource group.

Advantageously, the method in an aspect can proactively balance application workload among different servers and LEO satellite data centers without a need to wait for detection of overload conditions. The proactive balancing can provide sufficient coverage time for the application before the LEO satellite data center leaves an activation region of the application.

One or more of the following aspects or features can be separable or optional from each other in one or more embodiments.

In another aspect, the determination of the activation window of the application can include sending, by the processor, an in-band message queue (PLMQ) based query to the application to retrieve the permission policies of the application and identifying, by the processor, an activation time window of the application from the application permission policies. The identification of the activation time window of the application can allow the processor to map time windows where the LEO satellite data center overlaps with an activation region of the application to the activation time window of the application to accurately schedule the server to run the application.

Yet in another aspect, the scheduling can be performed prior to the LEO satellite data center arriving at an activation region of the application. The scheduling prior to the LEO satellite data center arriving at the activation region can provide sufficient coverage time for the application before the LEO satellite data center leaves the activation region.

Yet in another aspect, the processor can retrieve physical parameters of the LEO satellite data center and determine the orbital movements of the LEO satellite data center using the physical parameters. The determined orbital movements can be mapped to the activation window for accurately scheduling the server to run the application.

Yet in another aspect, the processor can detect a change in a workload of the application, allocate a new resource group to the application, and schedule the server in the LEO satellite data center to run the application according to the result of the mapping and the allocation of the new resource group. The allocation of the new resource group can optimize a workload of the server in response to changes of the application.

Yet in another aspect, the processor can detect a change in a workload of the application, modify at least one resource in the resource group allocated to the application, and schedule the server in the LEO satellite data center to run the application according to the result of the mapping and the modification to the resource group. The allocation of the modified resource group can optimize a workload of the server in response to changes of the application.

A system that includes at least a LEO satellite and a data center can be provided, where the data center can be configured to perform one or more aspects of the methods described herein.

A computer program product that includes a computer readable storage medium having program instructions embodied therewith, the program instructions readable by a device to cause the device to perform at least one or more aspect of the methods described above can be provided.

An example technical use case of the methods, systems, and computer program products described herein include mobile device communication applications such as 5G and 6G applications and IoT applications. Mobile device communication applications and IoT applications can use the methods, systems, and computer program products described herein to communicate with LEO satellite data centers for accessing applications being run by the LEO satellite data centers. The methods, systems, and computer program products described herein can proactively balance application workload among different servers and LEO satellite data centers without a need to wait for detection of overload conditions. The proactive balancing can provide sufficient coverage time for the application before the LEO satellite data center leaves an activation region of the application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

FIG. 1 illustrates an example computer or processing system or environment that may implement a system for workload management in low Earth orbit data centers in one embodiment. As shown in FIG. 1, computing environment 100 can include an example of an environment for the execution of at least some of the computer code involved in performing the inventive methods described herein, such as a low Earth Orbit (LEO) management algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
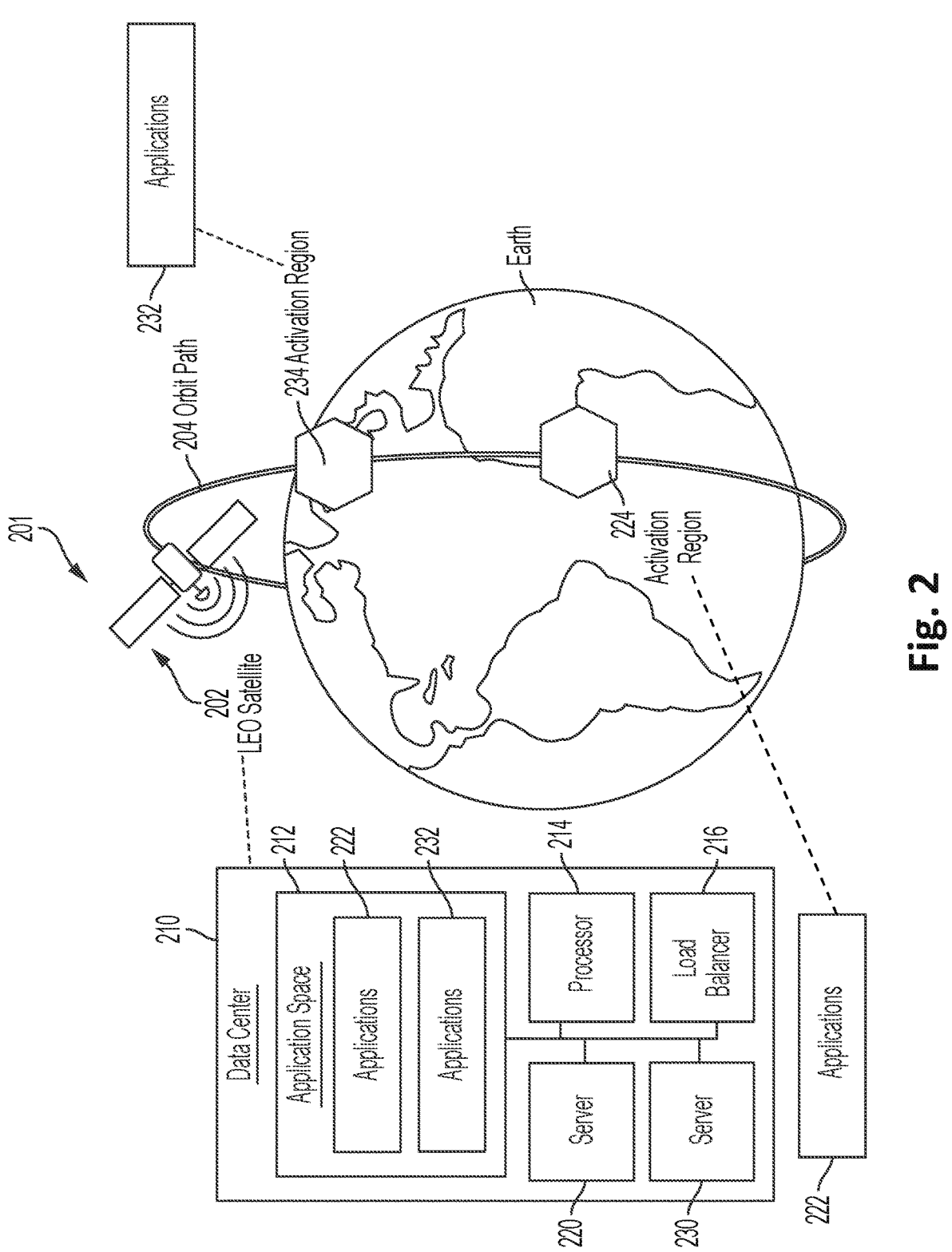
FIG. 2 illustrates an example system for implementing workload management in low Earth orbit data centers in one embodiment.

FIG. 2 illustrates an example system for implementing workload management in low Earth orbit data centers in one embodiment. In an example shown in FIG. 2, a system 201 can include an LEO satellite 202 that includes a data center 210. System 201 can be computing system 100 shown in FIG. 1 or can be a part of computing system 100 shown in FIG. 1. Data center 210 can be connected to, coupled to, attached to, integrated, or embedded in, LEO satellite 202 such that data center 210 can orbit around Earth as LEO satellite 202 orbits around Earth. LEO satellite 202 can orbit around Earth along an orbit path 204. Orbit path 204 can be relatively close to Earth's surface, such as being less than 1,000 km. Orbit path 204 can be arbitrarily defined and may not need to be defined by existing topological conventions, such as longitudinal or latitudinal lines, such as not needing to follow Earth's equator. Although one LEO satellite with a data center is shown as orbiting Earth in FIG. 2, more than one LEO satellite can orbit around Earth simultaneously, each may be connected to a respective data center.

Data center 210 can include at least an application space 212, at least one server such as servers 220, 230, at least one hardware processor such as processor 214, at least one load balancer 216, and other hardware components such as memory devices, network cards, switches, transceivers, controllers, integrated circuits (ICs), and other hardware components that can be found in a data center. Load balancer 216 can be configured to perform load balancing among servers in data center 210. In one embodiment, data center 210 can include more than one load balancers and the load balancers can be configured to perform load balancing for one server in data center 210. For example, a first load balancer can perform load balancing for server 220 and a second load balancer can perform load balancing for server 230. Processor 214 can be, for example, a microprocessor, one or more processing cores, a central processing unit (CPU), or other types of hardware processing elements. Processor 214 can include other hardware components such as memory devices. Processor 214 can be configured to control components and operations of data center 210. Application space 212, servers 220, 230, processor 214, load balancer 216, and other hardware components of data center 210 can communicate with one another via a communication bus in data center 210.

Application space 212 can store source code, executable code, and data associated with a plurality of applications. Applications in application space 212 can be assigned to different servers in data center 210. For example, a set of applications 222 can be assigned to server 220 and a set of applications 232 can be assigned to server 230. Server 220 can be configured to communicate with user devices on Earth's surface that request access to the set of applications 222 and server 230 can be configured to communicate with user devices on Earth's surface that request access to the set of applications 232.

In an aspect, the assignment of applications in application space 212 to different servers in data center 210 can be dependent on geographical locations. By way of example, applications 222 can be dedicated to a first geographical or activation region 224 such that server 220 can activate applications 222 when data center 210 orbits to a location above activation region 224. In an aspect, an activation region can be a geographical region on Earth that is bounded by predefined geographical boundaries. Applications 232 can be dedicated to a second geographical or activation region 234 such that server 230 can activate applications 232 when data center 210 orbits to a location above activation region 234. The assignments can be mutually exclusive, such that server 220 may not activate applications 222 when data center 210 orbits to the location above activation region 234 and vice versa. In one embodiment, the dedication or assignments of applications to different activation regions can be predefined by users of data center 210. In one embodiment, the geographical boundaries defining activation regions of the applications in application space 212 can be defined as part of the permission policies of the applications.

Data center 210 can orbit around Earth and communicate with user devices, such as edge devices, mobile devices, IoT devices, or the like, at different activation regions on Earth's surface. The capability of LEO satellite data centers, such as data center 210 shown in FIG. 2, to exchange data with user devices on Earth's surface can offer various benefits. Since the user devices are directly connected to LEO processing locations, the transmission latency is relatively low due to omitted interference of intermediate network components. Further, since LEO satellites are orbiting closer to Earth's surface, user devices on Earth can connect directly to the LEO satellites for data exchange without intermediate processing such as Earth-based eNodeB. In an aspect, LEO satellites may replace eNodeB in fifth generation (5G) and sixth generation (6G) applications for mobile devices due to their capability to connect to the LEO transceivers to serve the connections to the target endpoints (e.g., user devices).

In an aspect, since LEO satellites revolve around Earth with relatively lower height, they are not stationary with respect to Earth's movement. Further, since their movement can be observed from Earth, to maintain the rotation equilibrium, the orbiting speed of LEO satellites can be relatively high. The relatively high orbiting speed of LEO satellites can impact the footprint region where the LEO satellites are being used for direct connection. By way of example, the high orbiting speed can decrease the coverage time of the LEO satellites, thus limiting the footprint region. Therefore, multiple orbiting LEO satellites may be needed in a plane to define a mesh network to offer continuous coverage for an area being covered by the plane. The LEO satellites in the mesh network can communicate with each other via inter-satellite link that can be a high speed network line between the LEO satellites.

The LEO satellite data centers motion dynamics (e.g., high speed, close to Earth's surface, and not limited to specific paths) may not need to be considered for terrestrial data centers since terrestrial data centers are static to a defined location on Earth's surface. However, when an LEO satellite data center is deployed, there are multiple factors that will impact the performance of the LEO satellite data center due to the motion dynamics and of the LEO satellite data center itself. In an aspect, the motion dynamics can cause workload imbalance on the physical devices in the satellite data centers.

By way of example, when data center 210 orbits to the location above activation region 224, server 220 can run the set of applications 222 and the user devices in activation region 224 can communicate with server 220 to access and request data from applications 222. In the event that the first server becomes overloaded when data center 210 is above activation region 224, load balancer 216 can detect the overload condition and perform load balancing. For example, load balancer 216 can move requests from user devices in activation region 224 to another server, different from server 220, that is also assigned to run the set of applications 222. However, due to the motion dynamics of LEO satellite 202 and data center 210 (e.g., moving at relatively high speed), data center 210 may orbit outside of activation region 224 before load balancer 216 makes a decision to perform load balancing, or before all requests in activation region 224 are completed. The same situation can occur for server 230 when data center 210 orbits to the location above activation region 234.

To be described in more detail below, processor 214 in data center 210 can be configured to proactively retrieve various data relating to LEO satellite 202 and data center 210, and use the retrieved data to estimate the motion dynamics of LEO satellite 202 and data center 210. The estimated motion dynamics can include at least estimation of arrival times, locations, and duration of stay of LEO satellite 202 and data center 210. The estimated motion dynamics can be used for managing, balancing and optimizing workload among the servers in data center 210.

Figure 3:
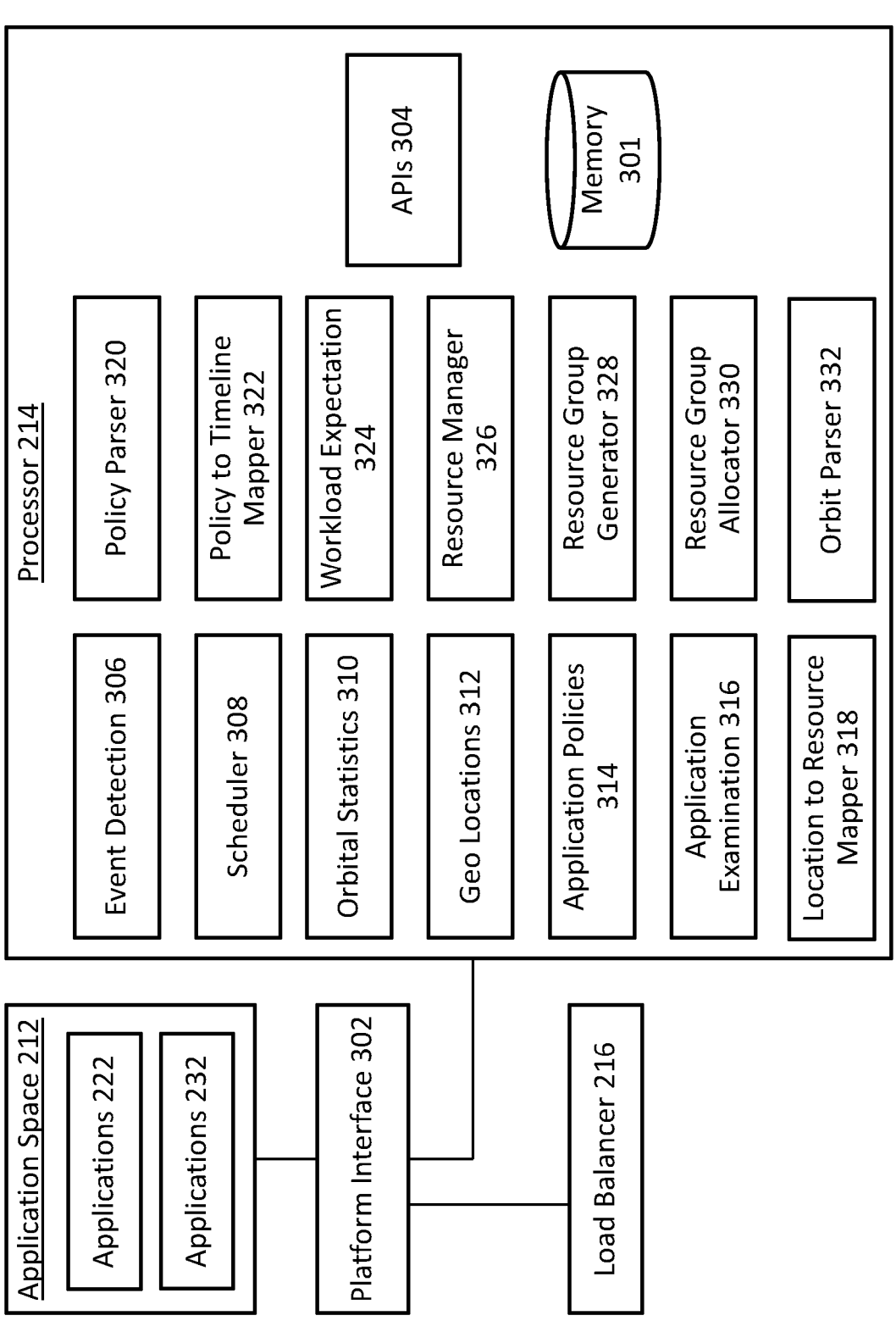
FIG. 3 illustrates components of a processor that can be used for implementing workload management in low Earth orbit data centers in one embodiment.

FIG. 3 illustrates components of a processor that can be used for implementing workload management in low Earth orbit data centers in one embodiment. Descriptions of FIG. 3 may reference components that are shown in FIG. 2. In an embodiment shown in FIG. 3, processor 214 can include a plurality of hardware and/or logic components configured to estimate trajectory and locations of LEO satellite 202 and data center 210 shown in FIG. 2, and to determine activation time windows for applications. The information estimated by processor 214 can be used for proactive workload balancing of applications and other workloads, where proactive workload balancing can refer to actively initiating workload balancing without the workload balancing being triggered by specific events. In the example embodiment shown in FIG. 3, processor 214 can include a memory device or memory 301. Memory 301 can include volatile memory and non-volatile memory devices configured to store various data retrieved and determined by processor 214.

Further, processor 214 can run or invoke a plurality of application programming interfaces (APIs) 304 to communicate with applications in application space 212, via a platform interface 302, and/or to allow applications in application space 212 to communicate with one another. Processor 214 can also run APIs 304 to retrieve data from applications in application space 212. In one embodiment, processor 214 can perform handshaking with LEO satellite 202 and transmit data requirement signals to LEO satellite 202 for requesting specific required data, and to detect network orchestration events of network planes that include LEO satellite 202. Processor 214 can run a logic component labeled as event detection 306 to invoke LEO infrastructure APIs among APIs 304 to perform the handshaking.

Processor 214 can be further configured to run a logic component labeled as orbit parser 332. In one embodiment, processor 214 can invoke APIs 304 to allow orbit parser 332 to communicate with LEO satellite 202. Processor 214 can run orbit parser 332 to retrieve the physical parameters, from various LEO infrastructure resources, relating to motion dynamics of LEO satellite 202. In one embodiment, the physical parameters can be received in the form of tuples and orbit parser 332 can translate the tuples into digital data having data structure that can be interpreted and processed by processor 214. Processor 214 can store the physical parameters, in the digital form outputted by orbit parser 332, as orbital statistics 310 and geo locations 312 in memory 301. In one embodiment, processor 214 can retrieve the physical parameters over time and store the physical parameters from different times as historical physical parameters. Processor 214 can also determine various statistics, such as averages, medians, standard deviations, or other statistics, of heights, footprint region durations, trajectories, moving or orbiting speeds, rotations, of LEO satellite 202. The determined statistics can be among the stored orbital statistics 310.

Processor 214 can further retrieve a plurality of application permission policies from one or more applications in application space 212. For example, processor 214 can retrieve a plurality of application permission policies from every application in application space 212. In one embodiment, processor 214 can invoke APIs 304 to retrieve the permission policies from application space 212. The permission policies being retrieved can include blackout regions and times, geographical or activation regions where the applications are permitted to run, peak allowed activation policies indicating peak workload timelines of the applications, or other permission policies. By way of example, the permission policies can indicate that applications 222 are permitted to run in activation region 224 and that applications 232 are permitted to run in activation region 234.

In one embodiment, processor 214 can send in-band message queue (PLMQ) based queries to one or more applications in application space 212 to retrieve the permission policies and activation regions. Processor 214 can further run a function labeled as policy parser 320 to translate the retrieved permission policies that resulted from the PLMQ based queries into digital data having data structure that can be interpreted and processed by processor 214. Processor 214 can store the permission policies, in the digital form outputted by policy parser 320, as application policies 314 in memory 301 in FIG. 3. In one embodiment, processor 214 can store application policies 314 as metadata classes such that application policies 314 can be used by a policy to timeline mapper 322.

Processor 214 can further run a logic component labeled as a policy to timeline mapper 322 ("mapper 322"). Processor 214 can run mapper 322 to map locations of LEO satellite 202 at different times with activation time windows of the applications in application space 212 as indicated in application policies 314. The outputs from mapper 322 can indicate whether the orbit path 204 includes locations that are above activation regions of applications in application space 212 that are assigned to the servers in data center 210. For example, to manage and plan workload of server 220, processor 214 can identify locations along orbit path 204 that are above activation region 224 of applications 222 assigned to server 220. The outputs of mapper 322 can indicate the identified locations as overlapping points between locations of LEO satellite 202 at different times with activation time windows of the applications.

In response to identifying locations on orbit path 204 that are above activation region 224, processor 214 can analyze orbital movements of LEO satellite 202 to determine a time window, or coverage times, in which LEO satellite 202 orbits to the identified locations. These coverage times determined by processor 214 can be stored as workload expectation data 324 in memory 301. processor 214 can run a function labeled as scheduler 308 to schedule activation of applications based on the determined coverage times. Processor 214 can also run scheduler 308 to assign different servers to run different applications separately during peak workload time periods.

Figure 5:
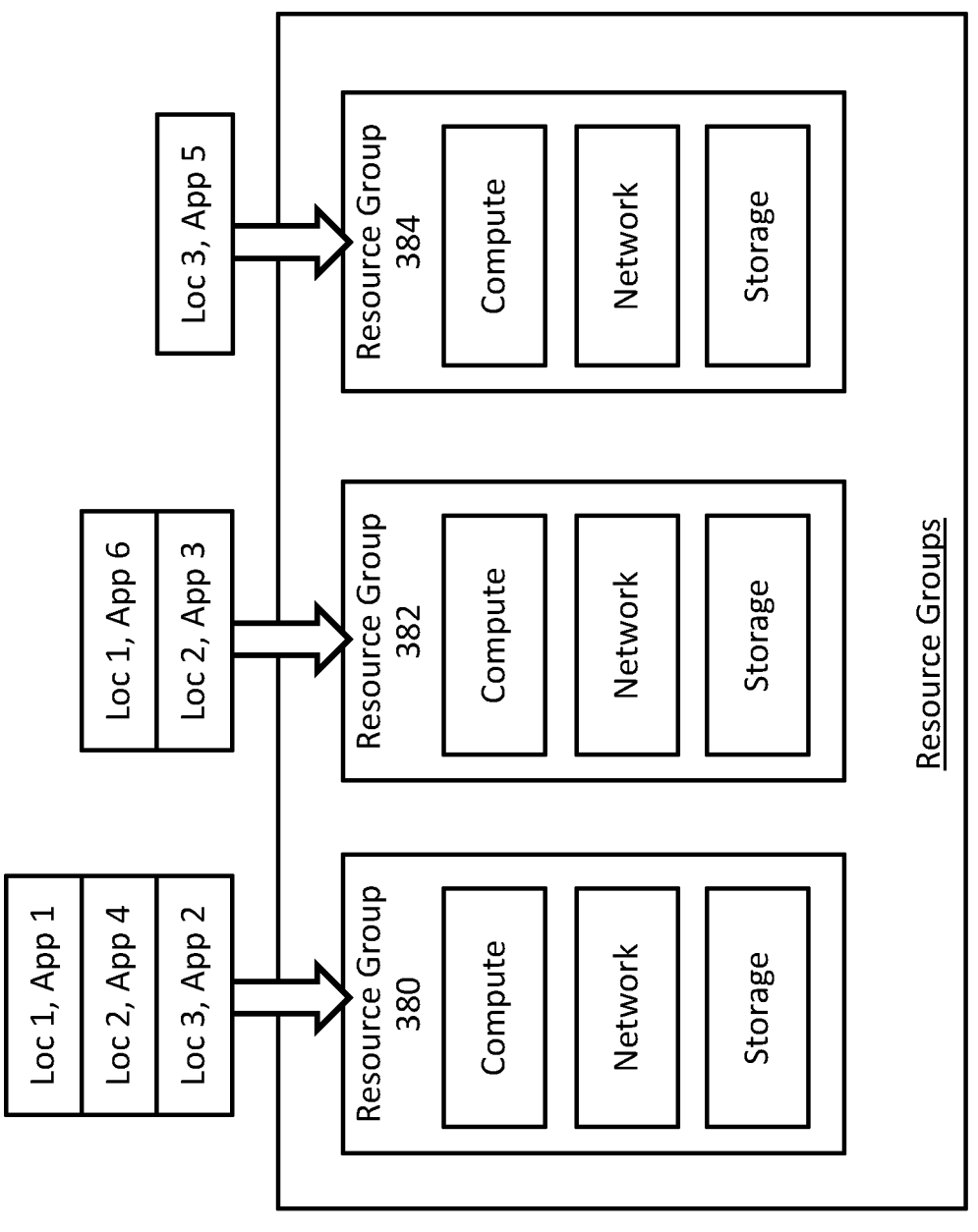
FIG. 5 illustrates an example of resource group allocation for implementing workload management in low Earth orbit data centers in one embodiment.

Processor 214 can be further configured to run a logic component labeled as resource manager 326 to manage availability of resources for allocation. In one embodiment, processor 214 can run a logic component labeled as application examination 316 to determine the type of resources that may be suitable for one or more applications in application space 212. In one embodiment, processor 214 can run a logic component labeled as resource group generator 328 to generate a plurality of resource groups. A resource group can include at least a network resource, a compute resource, and a storage resource. Examples of resource groups are shown in FIG. 5.

In response to generating resource groups, processor 214 can run a logic component labeled as resource group allocator 330 to allocate different resource groups to different applications in application space 212. Resource group allocator 330 may allocate resource groups such that applications running at the same time does not have overlapping resource groups.

In one embodiment, processor 214 can run a logic component labeled as location to resource mapper 318 ("mapper 318") to map allocated resource groups to activation regions. Processor 214 can run scheduler 308 to ensure that a resource group mapped to an activation region is available when LEO satellite 202 orbits to the activation region. In response to allocating different resource groups to different applications, processor 214 can run scheduler 308 to update the assignments and schedules of servers in data center 210 to run the applications. Scheduler 308 can schedule expected workload according to activation time windows and resource allocations. Processor 214 can provide the scheduled expected workload to load balancer 216 and load balancer 216 can assign the servers in data center 210 to run applications according to the schedule.

Figure 4:
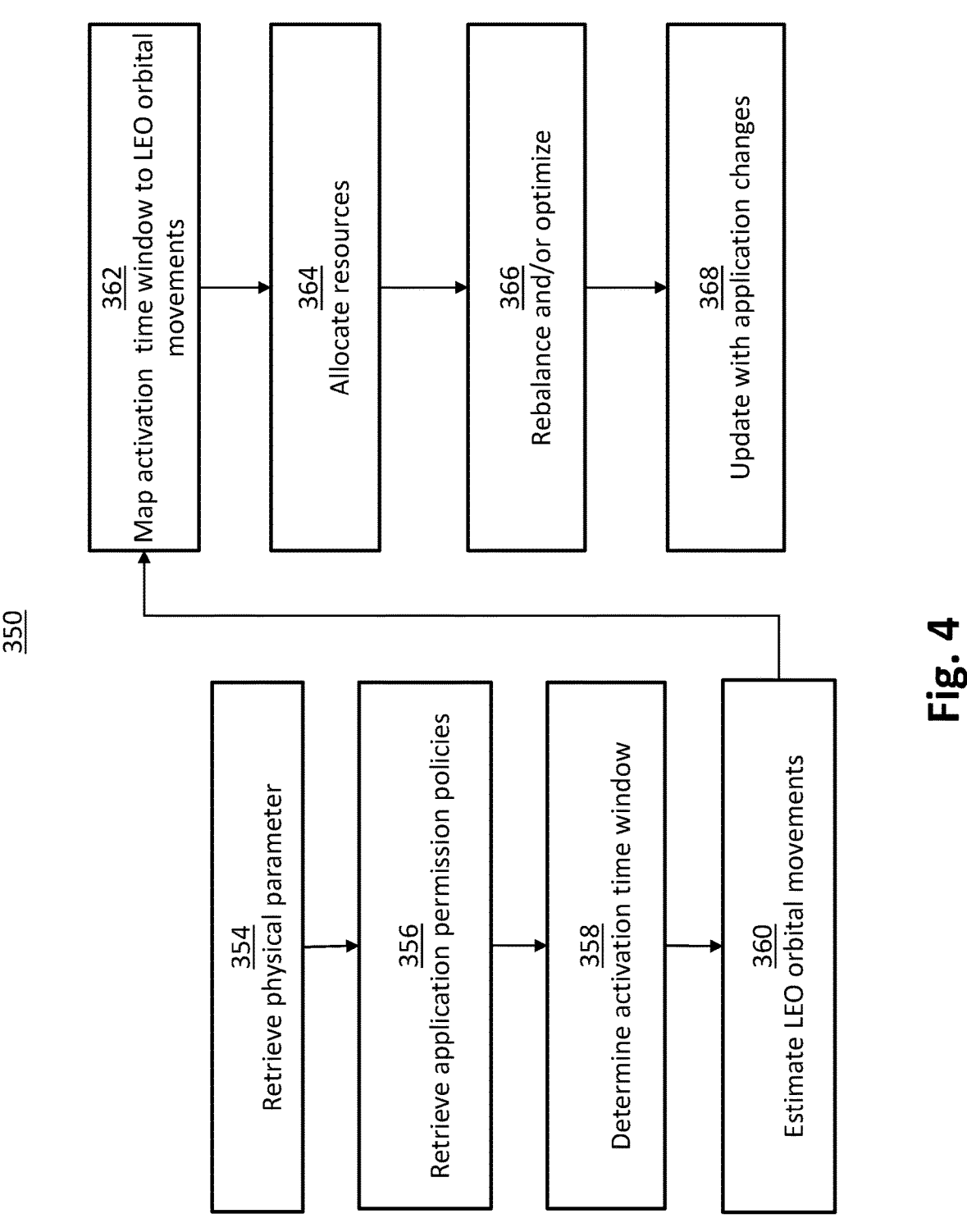
FIG. 4 illustrates a method or process for implementing workload management in low Earth orbit data centers in one embodiment.

FIG. 4 illustrates a method or process for implementing workload management in low Earth orbit data centers in one embodiment. The method or process shown in FIG. 4 can be implemented by one or more computer processors. For example, at least some of the components shown in FIG. 3 for implementing workload management in low Earth orbit data centers may perform the method shown in FIG. 4. in one embodiment. An LEO offload manager and identifier process (or process 350) can be a process that can be implemented by one or more computer processors, an example of which is shown as processor 214 in FIG. 3. A computer processor can run process 350 to proactively retrieve various information relating to LEO satellite 202 and data center 210, and to use the retrieved information to manage and schedule workload among servers in data center 210 and/or among different LEO satellite data centers. Process 350 can be a proactive process, for example, process 350 can be performed without being triggered by spontaneous events such as overload conditions at servers of data center 210.

In one embodiment, a processor such as a computer processor can create an instance of process 350 and run the created instance to perform the steps of process 350 shown in FIG. 4. Upon the creation of the instance, the processor can also define and load data structures that can be used by the created instance. The processor can also trigger various data resources in data center 210 to send data streams including data that may be necessary for running process 350. The processor can also identify receiving locations to receive and store the data being provided by the data resources. In one embodiment, the processor can use softwarization insertions (e.g., integration of software-based components, features, or functionality) in existing management components of data center 210 (e.g., processor 214 and/or load balancer 216) and trigger virtual network functions to provision data from the data resources. In one embodiment, the processor can invoke APIs 304 shown in FIG. 3 to perform handshaking with LEO satellite 202 and transmit data requirement signals to LEO satellite 202 for requesting specific required data, and to detect network orchestration events of network planes that include LEO satellite 202.

At block 354, the processor can retrieve or pull physical parameters of LEO satellites from various data resources. In one embodiment, the processor can invoke APIs, such as APIs 304 shown in FIG. 3, to retrieve the physical parameters. Physical parameters being retrieved at block 354 can include, for example, current height, footprint region, satellite geolocations, trajectory, orbital plane information, average moving speed, orbital characteristics of motion information including direction vectors, speed and rotation information of LEO satellite 202, or other physical parameters of LEO satellites and data centers orbiting around Earth, including LEO satellite 202 and data center 210.

At block 356, the processor can retrieve a plurality of application permission policies from applications in application space 212. In one embodiment, the processor can invoke APIs, such as APIs 304 shown in FIG. 3, to retrieve the permission policies from application space 212. The permission policies being retrieved at block 356 can include blackout regions and times, geographical or activation regions where the applications are permitted to run, peak allowed activation policies indicating peak workload timelines of the applications, or other permission policies. By way of example, the permission policies can indicate that applications 222 are permitted to run in activation region 224 and that applications 232 are permitted to run in activation region 234.

At block 358, the processor can determine activation time windows of applications in application space 212. Activation time windows of an application can be a time window in which the application is activated. In one embodiment, application policies 314 can include workload information of the applications in application space 212.

By way of example, application policies 314 can include information indicating a blackout activation time for a public transportation application is 12 AM to 6 AM and its peak workload times can be during morning and evening commuting hours. In another example, a meal delivery application may have blackout activation time between 9 PM to 9 AM and its peak workload times can be during lunch and dinner timeframes. Based on these information, the processor can determine that an activation time window for the public transportation application can be 6 AM to 12 AM and an activation time window for the meal delivery application can be 9 AM to 9 PM. In this example, the public transportation application and meal delivery application can have overlapping activation times. Also, in an aspect, evening commuting hours and dinner time may have similar time frame, thus the peak workload times for the public transportation application and the meal delivery application may have overlapping peak workload times.

By way of example, if server 220 is assigned to run the meal delivery application, then the processor can determine that server 220 needs to be activated between 9 AM to 9 PM. If server 220 is assigned to run both the public transportation application and the meal delivery application, then the processor can determine that server 220 needs to be activated between 6 AM to 11 PM.

At block 360, the processor can estimate or determine orbital movements of all LEO satellites and their attached data center, including LEO satellite 202 and data center 210, using the physical parameters retrieved in block 354. By way of example, based on a plurality of locations of LEO satellite 202 at different times, the processor can determine orbit path 204 shown in FIG. 2. The processor can also determine orbit paths for different LEO satellites orbiting around Earth. In an aspect, different LEO satellites can have differential orbital characteristics. For example, different LEO satellites can orbit around Earth along their respective orbit path with different speeds. The processor can be configured to determine different orbital characteristics and movements of different LEO satellites using the physical parameters.

At block 362, the processor can map the activation time windows determined at block 358 to the orbital movements determined at block 360. In one embodiment, the processor can run policy to timeline mapper 322 shown in FIG. 3 to perform block 362.

In response to identifying locations that are above activation region 224, the processor can analyze orbital movements of LEO satellite 202 to determine a time window in which LEO satellite 202 orbits to the identified locations. By way of example, if LEO satellite 202 is within the identified locations 7 AM to 11 AM, then the processor can determine that server 220 can provide coverage for the public transportation application for activation region 224 at the time window 7 AM to 11 AM. If LEO satellite 202 is within the identified locations 4 AM to 8 AM, then the processor can determine that server 220 can provide coverage for the public transportation application for activation region 224 at the time window 6 AM to 8 AM since the times 4 AM to 6 AM is outside of the activation time window of the public transportation application. These coverage times determined by the processor can be stored as workload expectation data 324 in memory 301.

Further, additional servers in data center 210 different from server 220 can be assigned to run applications 222. If applications 222 include the public transportation application, and the processor can determine that morning commute hours, such as 7 AM to 9 AM, is a peak workload time period of the public transportation application, the processor can identify the additional servers to run the public transportation application during the peak workload time period with server 220 simultaneously.

In one embodiment, more than one LEO satellite can orbit along respective orbit paths that can also include locations above activation region 224. When multiple LEO satellite data centers orbit to locations above activation region 224, the LEO satellite data centers can form a mesh network to provide coverage for devices in activation region 224. The LEO satellite data centers forming the mesh network can change over time since different LEO satellite data centers can have different orbital characteristics. For example, some LEO satellite data centers in the mesh network can leave activation region 224 first while new LEO satellite data centers can reach activation region 224 to join the mesh network. LEO satellite data centers forming the mesh network can communicate with one another using inter-satellite links. By way of example, if the processor determines that servers in data center 210 may only cover 7 AM to 11 AM, the processor can communicate with other LEO satellite data centers to seek coverage for activation region 224 from 6 AM to 7 AM and from 11 AM to 12 AM.

In response to determining the coverage of activation region 224 by data center 210 and other LEO satellite data centers, the processor can run a scheduler, such as scheduler 308 shown in FIG. 3, to schedule activation of applications based on the determined coverage. By way of example, if data center 210 can cover 7 AM to 11 AM for the public transportation application, the processor can run scheduler 308 to schedule server 220, and other servers assigned with the public transportation application, to activate the public transportation application 7 AM to 11 AM. The processor can also communicate with other processors in other LEO satellite data centers that provides coverage from 6 AM to 7 AM and 11 AM to 12 AM.

In one embodiment, if two applications have overlapping peak workload time periods, then the processor can run the scheduler to assign different servers to run the two applications separately during the peak workload time periods. By way of example, if the public transportation application and the meal delivery application have overlapping peak workload time periods at 6 PM to 8 PM, then the processor can run the scheduler to schedule server 220 to run the public transportation application and another server to run the meal delivery application from 6 PM to 8 PM.

At block 364, the processor can allocate resources in data center 210 to different applications in application space 212. In one embodiment, the processor can run resource manager 326 shown in FIG. 3 to manage availability of resources for allocation. Further, in block 364, the processor can run application examination 316 shown in FIG. 3 to determine the type of resources that may be suitable for applications in application space 212. Also in block 364, the processor can run resource group generator 328 shown in FIG. 3 to generate a plurality of resource groups. A resource group can include at least a network resource, a compute resource, and a storage resource. Examples of resource groups are shown in FIG. 5.

Network resources can be resources for network communications such as network cards, transceivers, switches, or other network communication equipment. Compute resources can be resources for computations such as processors, processor cores, microprocessors, processing pipelines, application specific integrated circuits, or other computing resources. Storage resources can be memory devices including volatile and non-volatile memory devices, caches, registers, or specific groups of memory addresses. Further, one or more resource groups, can be end-to-end component groups, which can be a group of components allocated to an application for the application to utilize from a start of the application to an end of the application. In other words, applications may not be switching resource groups while being run by their assigned servers.

In response to generating resource groups, the processor can run a resource group allocator, such as resource group allocator 330 shown in FIG. 3, to allocate different resource groups to different applications in application space 212. The resource group allocator can allocate resource groups such that applications running at the same time may not have overlapping resource groups. By way of example, if the public transportation application and the meal delivery application have overlapping activation time windows, such as 9 AM to 9 PM, then resource group allocator 330 can allocate a first resource group to the public transportation application and can allocate a second resource group to the meal delivery application.

At block 366, the processor can optionally rebalance or optimize the workload scheduled by the scheduler, such as scheduler 308 shown in FIG. 3. In an aspect, the workload of applications in application space can change over time, thus changing workload of the servers in data center 210 as well. In one embodiment, to perform rebalance or optimization, the processor can make changes to the allocated resource groups. For example, if a first application's workload is reducing over time and a second application's workload is increasing over time, and if a resource group with stronger processing power is already allocated to the first application, then the processor can rebalance by reallocating the resource group with stronger processing power to the second application and another resource group with weaker processing power to the first application.

At block 368, if there are any changes to any applications in application space 212, the processor can update various information that are retrieved and determined in process 350. In one embodiment, the processor can detect, such as via APIs 304 and platform interface 302 shown in FIG. 3, changes to applications in application space 212. In response to detection of the changes, the processor can issue an interrupt to process 350 and restart process 350 to acquire new information, such as new workload information and activation windows, to update workload expectations, mappings, and reschedule server activations.

FIG. 5 also shows an allocation example of six applications, labeled as App 1, App 2, App 3, App 4, App 5, App 6. Some of the six applications can be activated at different activation regions Loc 1, Loc 2, Loc 3. By way of example, App 1 and App 6 can be activated in activation region Loc 1, App 3 and App 4 can be activated in activation region Loc 2, and App 2 and App 5 can be activated in activation region Loc 3. A resource group 380 can be allocated to App 1, App 2 and App 4, a resource group 382 can be allocated to App 3 and App 6 and a resource group 384 can be allocated to App 5. Note that since App 1, App 2 and App 4 are being activated in different activation regions, one application among App 1, App 2 and App 4 can use resource group 380 at one activation region. Further, App 1 and App 6 are allocated with different resource groups 380, 382 and thus, at activation region Loc 1, App 1 and App 6 would not be sharing resources and the server running these applications can achieve balanced workload.

In one embodiment, a particular resource group can be assigned to multiple applications in the same activation region, where the multiple applications may not have overlapping activation time window. By way of example, a first application can have an activation time window of 7 AM to 8 AM and a second application can have an activation time window of 9 AM to 11 AM. A resource group can be allocated to both the first application and the second application and the first and second applications can utilize the resource group at their respective activation time windows.

In one embodiment, processor 214 can run location to resource mapper 318 ("mapper 318") to map allocated resource groups to activation regions. Using FIG. 5 as an example, resource group 380 can be mapped to Loc 1, Loc 2 and Loc 3. resource group 382 can be mapped to Loc 1 and Loc 2, and resource group 384 can be mapped to Loc 3. Processor 214 can run scheduler 308 to ensure that a resource group mapped to an activation region is available when LEO satellite 202 orbits to the activation region. For example, as LEO satellite 202 leaves Loc 1 and enters Loc 2, resource groups 380, 382 may need to reset specific parameters and settings to prepare for running applications App 4 and App 3 at Loc 2. Scheduler 308 can schedule activation of servers that run applications App 4 and App 3 at Loc 2 at a time that allows sufficient time for resource groups 380, 382 to reset.

In response to allocating different resource groups to different applications, processor 214 can run scheduler 308 to update the assignments and schedules of servers in data center 210 to run the applications. By way of example, scheduler can schedule server 220 to use the first set of resources to run the public transportation application during the time window 7 AM to 11 AM (e.g., when LEO satellite 202 is above activation region 224) and schedule server 220 to use the second set of resources to run the meal delivery application during the same time window 7 AM to 11 AM.

Thus, scheduler 308 can schedule expected workload according to activation time windows and resource allocations.

In one embodiment, to perform rebalance or optimization, the processor can perform a cross-group resource reallocation where individual resource in resource groups are reallocated instead of reallocating entire resource groups. For example, if a first application's workload is reducing over time and a second application's workload is increasing over time, and if a resource group having a stronger compute resource is already allocated to the first application, then the processor can rebalance by swapping the compute resource in the first application's resource group with the compute resource in the to the second application's resource group such that the second application can utilize the stronger computer resource.

Figure 6:
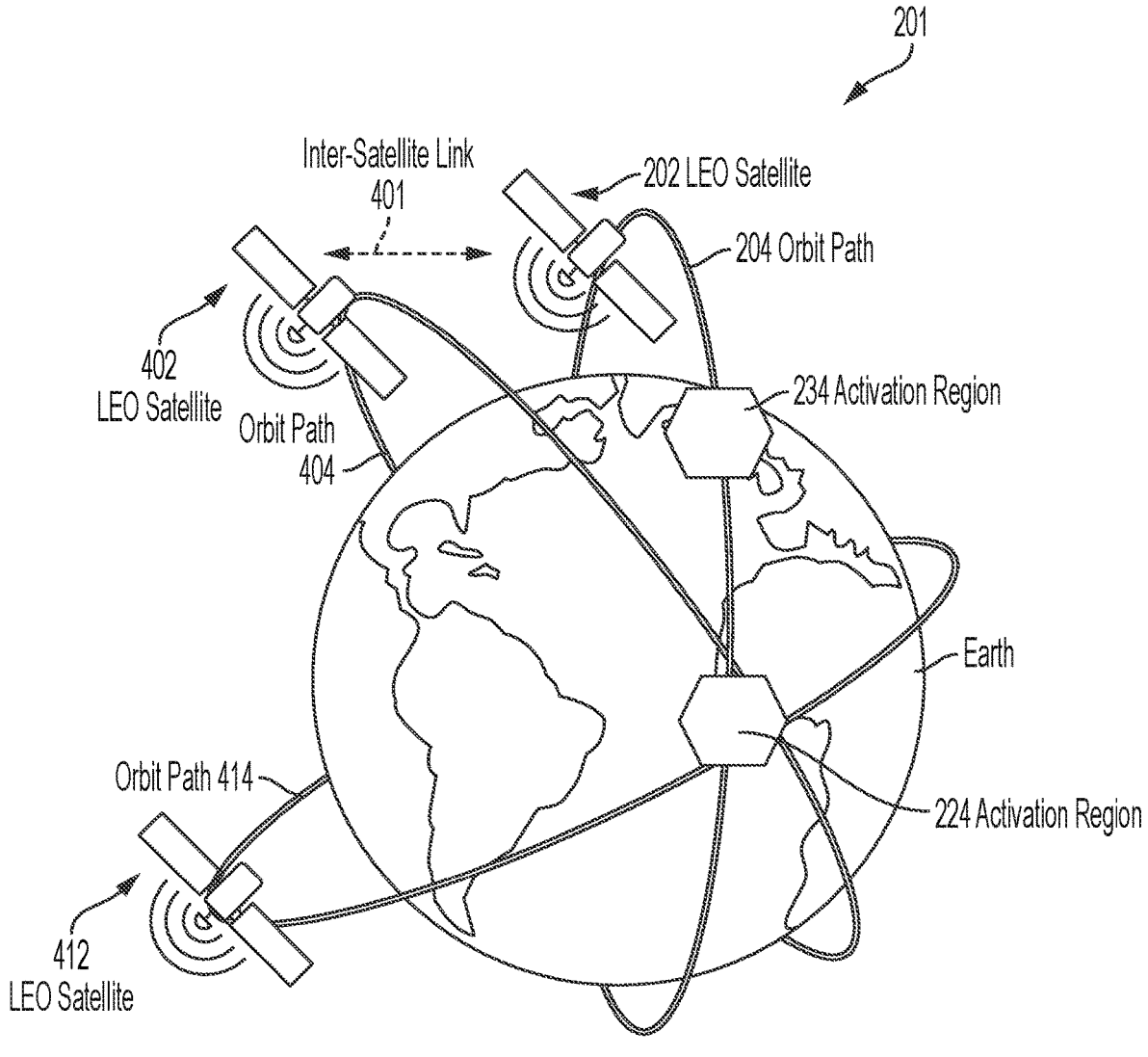
FIG. 6 illustrates another system for implementing workload management in low Earth orbit data centers in one embodiment.

FIG. 6 illustrates another system for implementing workload management in low Earth orbit data centers in one embodiment. In an example system shown in FIG. 6, system 201 can include multiple LEO satellites with respective data centers orbiting around Earth. In addition to LEO satellite 202, an LEO satellite 402 can orbit around Earth along an orbit path 404 and an LEO satellite 412 can orbit around Earth along an orbit path 414. In one embodiment, when LEO satellites 202, 402, 412 are above activation region 224, a mesh network can be formed to allow user devices on Earth's surface at activation region 224 to communicate with applications being run by data centers attached or connected to LEO satellites 202, 402, 412. Processor in data centers of one or more of LEO satellites 202, 402, 412 can perform process 350 described above.

The workload expectation, activation time windows and resource allocation of LEO satellite data centers can be communicated among the different LEO satellites via intersatellite communication link 401. By way of example, in a case where a server in LEO satellite 202 cannot run a specific application at activation region 224, LEO satellite 202 can communicate this information to LEO satellite 402 and LEO satellite 402 can run the specific application if both LEO satellites 202, 402 are above activation region 224 at the same time window. In another example, LEO satellite 202 and LEO satellite 402 can arrive at activation region 224 at different times. In a case where a server in LEO satellite 202 runs a specific application for a first subset of activation time window of the specific application, LEO satellite 202 can communicate this information to LEO satellite 402 and LEO satellite 402 can run the specific application for a second subset of activation time window of the specific application.

Conventional balancing techniques can be performed in response to detection of undesired conditions such as server overload or degradation in performance. The embodiment presented herein, such as process 350, can be performed periodically, in response to changes in applications in application space 212, and/or in response to changes in orbital characteristics of LEO satellite 202. Processor 214 may not need to wait for detection of undesired conditions to trigger process 350. Further, the generation and allocation of resource groups can provide assurance that the components being utilized by the applications would not overlap. The assignment of workloads using workload expectation, the LEO satellite orbital movement expectation, and the non-overlapping allocation of resource groups can provide a proactive load balancing that can be performed without a need to wait for detection of overload condition detection, and can also reduce potential risk of system congestion. Furthermore, individual LEO satellite data centers can perform process 350, and multiple LEO satellite data centers can communicate with one another to perform workload balancing before detection of overload conditions. The workload balancing performed by individual LEO satellite data centers can improve coverage time for activation regions when the individual LEO satellites arrive and leave the activation region at different times. Thus, there may be no need for extra cost to modify and remerge mesh networks formed by LEO satellite data centers that can enter and leave activation regions continuously.

FIG. 7 is a flow diagram illustrating a method of performing workload management in low Earth orbit data centers in one embodiment. Descriptions of FIG. 7 may reference components that are shown in FIG. 1 to FIG. 6. A process 500 is shown in FIG. 7, where process 500 can be performed by one or more computer processors, for example, processor 214 described herein or other processors of other LEO satellite data centers as described herein. Process 500 can include one or more operations, actions, or functions as illustrated by one or more of blocks 502, 504, 506, 508, 510 and/or 512. Although illustrated as discrete blocks, various blocks may be divided into additional blocks, combined into fewer blocks, eliminated, performed in different order, or performed in parallel, depending on the desired implementation.

At block 502, a processor in a LEO satellite data center can retrieve physical parameters of the LEO satellite data center. Process 500 can proceed from block 502 to block 504. At block 504, the processor can determine orbital movements of the LEO satellite data center using the physical parameters.

At block 506, the processor can determine an activation window of an application. In one embodiment, the determination of the activation window of the application can include sending, by the processor, an in-band message queue (PLMQ) based query to the application to retrieve the permission policies of the application and identifying, by the processor, an activation time window of the application from the application permission policies.

At block 508, the processor can map the orbital movements of the LEO satellite data center to the activation window of the application. At block 510, the processor can allocate a resource group to the application. In one embodiment, the resource group comprises at least a network resource, a compute resource, and a storage resource.

At block 512, the processor can schedule a server in the LEO satellite data center to run the application according to a result of the mapping and the allocation of the resource group. In one embodiment, the scheduling can be performed prior to the LEO satellite data center arriving at an activation region of the application. In one embodiment, the result of the mapping can indicate a time window in which the LEO satellite data center orbits to a location that overlaps with an activation region of the application.

In one embodiment, the processor can detect a change in a workload of the application, allocate a new resource group to the application, and schedule the server in the LEO satellite data center to run the application according to the result of the mapping and the allocation of the new resource group.

In one embodiment, the processor can detect a change in a workload of the application, modify at least one resource in the resource group allocated to the application, and schedule the server in the LEO satellite data center to run the application according to the result of the mapping and the modification to the resource group.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   determining, by a processor, an activation window of an application;
   mapping, by the processor, orbital movements of a low Earth orbit (LEO) satellite to the activation window of the application;

allocating, by the processor, a resource group to the application; and
scheduling, by the processor, a server to run the application according to a result of the mapping and the allocation of the resource group, wherein the server is in a data center coupled to the LEO satellite.

2. The computer-implemented method of claim 1, wherein the scheduling is performed prior to the LEO satellite arriving at an activation region of the application.

3. The computer-implemented method of claim 1, wherein determining the activation window of the application comprises:
   sending, by the processor, an in-band message queue (PLMQ) based query to the application to retrieve permission policies of the application; and
   identifying, by the processor, an activation time window of the application from the permission policies.

4. The computer-implemented method of claim 1, further comprising:
   retrieving, by the processor, physical parameters of the LEO satellite; and
   determining, by the processor, the orbital movements of the LEO satellite using the physical parameters.

5. The computer-implemented method of claim 1, wherein the resource group comprises at least a network resource, a compute resource, and a storage resource.

6. The computer-implemented method of claim 1, further comprising:
   detecting, by the processor, a change in a workload of the application;
   allocating, by the processor, a new resource group to the application; and
   scheduling, by the processor, the server in the data center to run the application according to the result of the mapping and the allocation of the new resource group.

7. The computer-implemented method of claim 1, further comprising:
   detecting, by the processor, a change in a workload of the application;
   modifying, by the processor, at least one resource in the resource group allocated to the application; and
   scheduling, by the processor, the server in the data center to run the application according to the result of the mapping and the modification to the resource group.

8. A system comprising:
   a low Earth orbit (LEO) satellite;
   a data center coupled to the LEO satellite, the data center being configured to:
   determine an activation window of an application;
   map orbital movements of the LEO satellite to the activation window of the application;
   allocate a resource group to the application; and
   schedule a server in the data center to run the application according to a result of the mapping and the allocation of the resource group.

9. The system of claim 8, wherein the data center is configured to schedule the server to run the application prior to the LEO satellite arriving at an activation region of the application.

10. The system of claim 8, wherein the data center is configured to:
   send an in-band message queue (PLMQ) based query to the application to retrieve permission policies of the application; and
   identify an activation time window of the application from the permission policies.

11. The system of claim 8, wherein the data center is configured to:

retrieve physical parameters of the LEO satellite; and determine orbital movements of the LEO satellite using the physical parameters.

12. The system of claim 8, wherein the resource group comprises at least a network resource, a compute resource, and a storage resource.

13. The system of claim 8, wherein the data center is configured to:

detect a change in a workload of the application;

allocate a new resource group to the application; and schedule the server in the data center to run the application according to the result of the mapping and the allocation of the new resource group.

14. The system of claim 8, wherein the data center is configured to:

detect a change in a workload of the application;

modify at least one resource in the resource group allocated to the application; and schedule the server in the data center to run the application according to the result of the mapping and the modification to the resource group.

15. A computer program product comprising a non-transitory computer readable storage medium having program instructions embodied therewith, the program instructions readable by a device to cause the device to:

determine an activation window of an application;

map orbital movements of a low Earth orbit (LEO) satellite data center to the activation window of the application;

allocate a resource group to the application; and schedule a server in the LEO satellite data center to run the application according to a result of the mapping and the allocation of the resource group.

16. The computer program product of claim 15, wherein the device is further caused to:

schedule the server to run the application prior to the LEO satellite data center arriving at an activation region of the application.

17. The computer program product of claim 15, wherein the device is further caused to:

send an in-band message queue (PLMQ) based query to the application to retrieve permission policies of the application; and identify an activation time window of the application from the permission policies.

18. The computer program product of claim 15, wherein the device is further caused to:

retrieve physical parameters of a low Earth orbit (LEO) satellite data center; and determine orbital movements of the LEO satellite data center using the physical parameters.

19. The computer program product of claim 15, wherein the device is further caused to:

detect a change in a workload of the application;

allocate a new resource group to the application; and schedule the server in the LEO satellite data center to run the application according to the result of the mapping and the allocation of the new resource group.

20. The computer program product of claim 15, wherein the device is further caused to:

detect a change in a workload of the application;

modify at least one resource in the resource group allocated to the application; and schedule the server in the LEO satellite data center to run the application according to the result of the mapping and the modification to the resource group.

* * * * *